United States Patent [19]
Jager

[11] 3,913,848
[45] Oct. 21, 1975

[54] PROCESS AND MEANS FOR COOLING CEMENT

[75] Inventor: Heinz Jager, Bochum, Germany

[73] Assignee: Westfalia Dinnendahl Groppel AG, Bochum, Germany

[22] Filed: Aug. 3, 1973

[21] Appl. No.: 385,453

Related U.S. Application Data

[63] Continuation of Ser. No. 144,816, May 19, 1971, abandoned.

[52] U.S. Cl. .................................. 241/54; 241/17
[51] Int. Cl.² ........................................ B02C 11/08
[58] Field of Search .......... 62/57; 263/53 R; 34/13, 34/20, 51; 55/310, 270, 274; 241/17, 18, 41, 65, 54

[56] References Cited
UNITED STATES PATENTS

| | | | |
|---|---|---|---|
| 2,400,382 | 9/1945 | Arnold | 241/17 |
| 3,070,990 | 1/1963 | Krinov | 55/270 X |
| 3,078,048 | 2/1963 | Russell et al. | 241/65 X |
| 3,334,516 | 8/1967 | Cedrone | 73/61 |
| 3,667,133 | 6/1972 | Lincoln | 34/20 |

*Primary Examiner*—William E. Wayner

[57] ABSTRACT

A cement cooling process and means are provided wherein the separator air is indirectly cooled by a cooler such as a blower tube cooler disposed in the separator air circuit of the air separator between the separator and an external fan. The separator air is divided with one portion of the cooled separator air being passed through a mill and returned to the separator with another portion of the cooled separator air being carried from the pressure line of the fan through a filter.

1 Claim, 1 Drawing Figure

U.S. Patent  Oct. 21, 1975  3,913,848
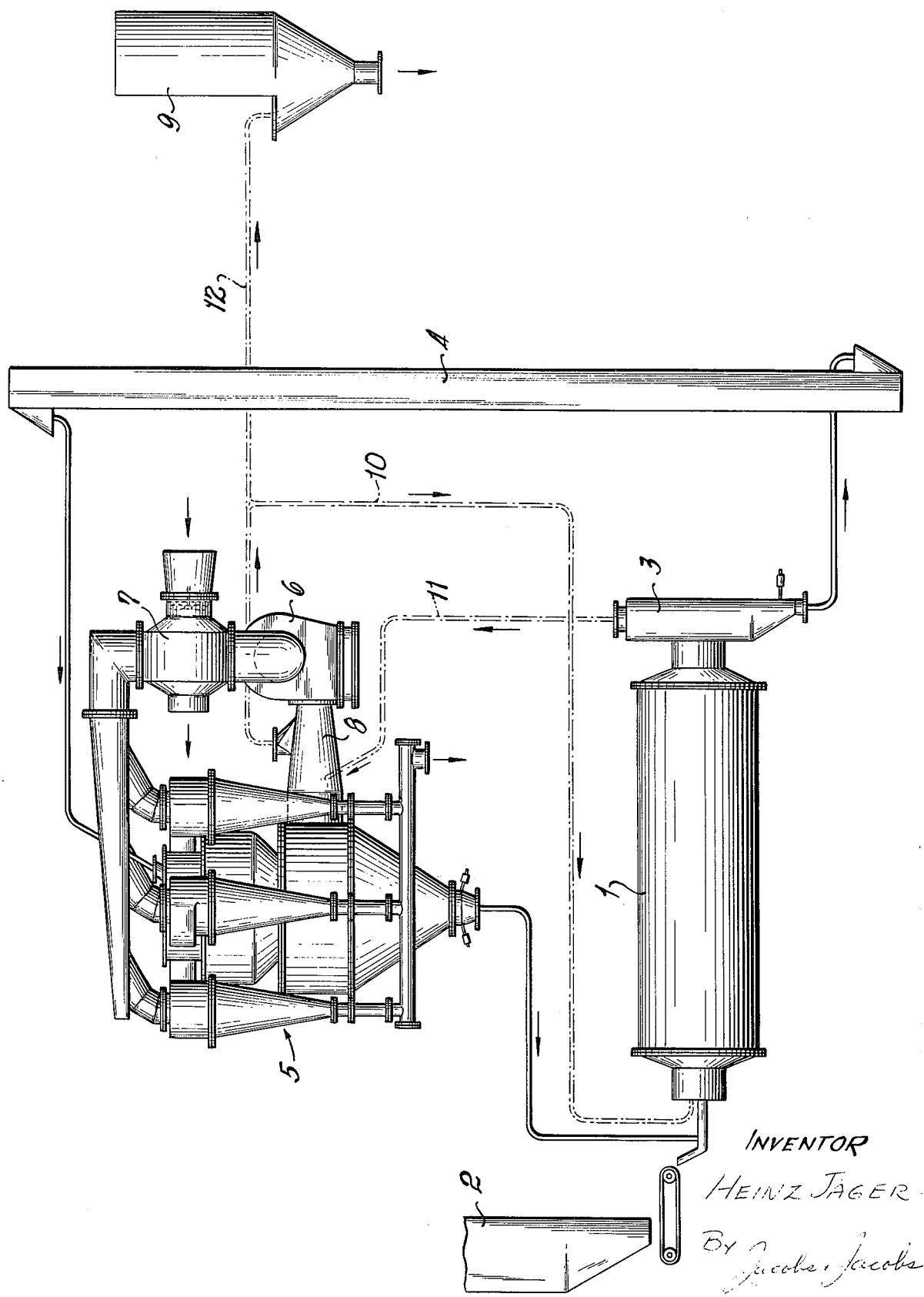
INVENTOR
HEINZ JÄGER

PROCESS AND MEANS FOR COOLING CEMENT

This is a continuation of application Ser. No. 144,816 filed May 19, 1971 now abandoned.

This invention relates to an economical and efficient process and apparatus for cooling cement in connection with the grinding of hot cement clinker in a closed circuit having an air separator and an external fan.

To meet the stringent requirements for cement to be used in concrete technology as to setting time, speed of hydration and green concrete temperature, in the art of grinding hot cement clinker, it is necessary to provide for cooling of the material. In the case of a "through" mill, it is known that at high grinding temperatures cooling can be effected by sprinkling or spraying the mill casing or housing with a coolant such as water from the outside. Adequate cooling is, however, not obtainable in this manner. When grinding cement in a closed circuit with an interposed separator, cooling might conceivably be brought about by introducing fresh air into the separator as the coolant. This would necessitate exhausting the resulting excess air from the separator into a special dust removal filter, in order to purify the rejected excess air of entrained dust. Since the mill likewise is equipped with a dust removal filter, this mode of cooling entails high initial and operating costs for cleaning the cooling air from the separator as well as for the dust removal air of the mill.

According to the invention, in the grinding of hot cement clinker in a closed circuit having an air separator and an external fan, the separator air is cooled indirectly to render the cooling economical. The cooler is for that purpose advantageously installed between the separator and the fan in the separator air circuit. Then the further possibility presents itself of circulating the mill dust removal air through the separator, a portion of the cooled separator air being passed through the mill and returned to the separator. In this case, a considerably smaller dust removal filter may be provided, since only a portion of the cooled separator air, namely the air infiltrating from the pressure line of the fan, need be carried off by way of the filter. Especially in large cement grinding installations, this results in lower operating and maintenance costs for the mill dust removal and separator cooling.

The single FIGURE of the drawing schematically illustrates a preferred embodiment of the invention by way of example.

The mill 1 is charged from feed hopper 2. The material passes by way of discharge chamber 3 to bucket conveyor 4, which delivers the ground cement clinker to the feeder of air separator 5. Air separator 5 is a separator with scatter disc feed and external cyclone separators. The external fan 6 circulates the separator air. In the separator air circuit, between separator 5 and fan 6, a cooler 7 is inserted, for example, a tube cooler with blower or other suitable indirect cooling means, for the separator air. From the pressure line 8 there is a partial dischage to the mill 1 through branch line 10 followed by its circuitous return to pressure line 8 through discharge chamber 3. The discharge is ducted from the discharge chamber 3 through pipe line 11 whereupon it is blown back through pressure line 8 into the air separator 5. Another portion of the cooled separator air, essentially the air entering by unavoidable infiltration, is eliminated from the circuit through pipe line 12 by way of filter 9.

What is claimed is:

1. Means for cooling hot cement clinker comprising a closed circuit having an air separator, an external fan for circulating the separator air and a cooler between the air separator and the fan in the air separator circuit to cool the separator air indirectly, a pressure line connecting and affording communication between the fan and the air separator and a line connecting and affording communication between the cooler and the air separator, and including means for passing a portion of the cooled separator air through the intake end of an associated mill and back to the air separator, a line connecting the pressure line to a filter for eliminating air entering the closed circuit by unavoidable infiltration and a branch line connecting an intermediate portion of the line leading to the filter with the intake end of the mill, the discharge end of the mill being provided with a discharge chamber connected by a pipeline to the pressure line and to a bucket conveyor which delivers the ground cement clinker as feed for the air separator.

* * * * *